US012484687B2

(12) United States Patent
Carmickle

(10) Patent No.: US 12,484,687 B2
(45) Date of Patent: Dec. 2, 2025

(54) FIREHOSE BACKPACK DEVICE

(71) Applicant: Roberto Carmickle, Spring Valley, CA (US)

(72) Inventor: Roberto Carmickle, Spring Valley, CA (US)

( * ) Notice: Subject to any disclaimer, the term of this patent is extended or adjusted under 35 U.S.C. 154(b) by 69 days.

(21) Appl. No.: 18/625,359

(22) Filed: Apr. 3, 2024

(65) Prior Publication Data

US 2025/0311837 A1 Oct. 9, 2025

(51) Int. Cl.

*A45F 3/04* (2006.01)
*A62C 33/00* (2006.01)
*A45F 3/00* (2006.01)

(52) U.S. Cl.

CPC .............. *A45F 3/047* (2013.01); *A62C 33/00* (2013.01); *A45F 2003/003* (2013.01); *A45F 2003/045* (2013.01)

(58) Field of Classification Search

CPC ................ A45F 3/047; A45F 2003/003; A45F 2003/045; A62C 33/00
USPC .......................................................... 224/637
See application file for complete search history.

(56) References Cited

U.S. PATENT DOCUMENTS 34,260 A * 1/1862 Miles ........................ A45F 3/04 224/606
2,266,334 A * 12/1941 Rice ....................... A62C 33/04 224/655
3,722,823 A * 3/1973 Reich ..................... A62C 35/20 137/355.27
3,942,636 A * 3/1976 Matsuyama ........... A62C 33/04 206/349
4,425,000 A * 1/1984 Keck, Jr. ................ A62C 33/04 294/151
4,442,557 A * 4/1984 Clemens .................. A61G 1/01 5/625
4,478,452 A * 10/1984 Clemens ................ A62C 33/00 294/149
4,685,601 A * 8/1987 Riddling ................ A62C 33/04 248/89
4,858,797 A * 8/1989 Rabska .................. A62C 33/00 224/651
D322,739 S 12/1991 Kashuba
5,195,596 A * 3/1993 Mount, III ............. A62C 33/00 224/236
5,341,973 A * 8/1994 Dawes ...................... A45F 3/04 221/185

(Continued)

FOREIGN PATENT DOCUMENTS

WO WO2017072052 5/2017

*Primary Examiner* — Peter N Helvey

(57) ABSTRACT

A firehose backpack device includes a backpack which an open a bottom end to access an interior space defined by the backpack to facilitate fire hoses to be inserted into the interior space for storing the fire hoses. The interior space is divided into a first half and a second half which each contain a respective fire hose. A first flap is disposed on the bottom end of the backpack for closing the first half wherein the first flap and a second flap is disposed on the bottom end of the backpack for closing the second half. A pair of pouches is each attached to the backpack to contain tools and accessories related to employing fire hoses. A shoulder harness is attached to the backpack and the shoulder harness can be worn over shoulders of a firefighter thereby facilitating the firefighter to carry the backpack on the firefighter's back.

13 Claims, 13 Drawing Sheets

(56) References Cited

U.S. PATENT DOCUMENTS

| | | | | |
|---|---|---|---|---|
| 5,579,966 | A | 12/1996 | Krumweide | |
| 6,581,998 | B1 * | 6/2003 | Clemens | A61G 1/01<br>294/152 |
| 8,052,186 | B2 | 11/2011 | O'Brien | |
| 10,117,502 | B2 * | 11/2018 | Ward | A45F 3/02 |
| 2018/0311521 | A1 | 11/2018 | Geisel | |

* cited by examiner

FIREHOSE BACKPACK DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to backpack devices and more particularly pertains to a new backpack device for carrying firehoses. The device includes a backpack which has an open bottom end for insertably receiving firehoses and the backpack has an interior that is divided into a first half and a second half which each contains a respective firehose. The device includes a pair of pouches which are attached to the backpack for containing tools and accessories related to firehoses and a shoulder harness that is attached to the backpack for carrying the backpack on a firefighter's back.

(2) Description of Related Art Including Information Disclosed Under 37 CFR 1.97 and 1.98

The prior art relates to backpack devices including a variety of backpack devices which includes a backpack that has an open top end for receiving firehoses for carrying the firehoses on a firefighter's back and a variety of harness devices that each at least includes shoulder straps and a series of harnesses attached to the shoulder straps for securing firehoses for carrying the firehoses on a firefighter's back. In no instance does the prior art disclose a backpack device that includes a backpack with an open bottom end for receiving firehoses and a strap attached to an outside of the backpack for securing a firehose to the outside of the backpack and a shoulder harness.

BRIEF SUMMARY OF THE INVENTION

An embodiment of the disclosure meets the needs presented above by generally comprising a backpack which an open a bottom end to access an interior space defined by the backpack to facilitate fire hoses to be inserted into the interior space for storing the fire hoses. The interior space is divided into a first half and a second half which each contain a respective fire hose. A first flap is disposed on the bottom end of the backpack for closing the first half wherein the first flap and a second flap is disposed on the bottom end of the backpack for closing the second half. A pair of pouches is each attached to the backpack to contain tools and accessories related to employing fire hoses. A shoulder harness is attached to the backpack and the shoulder harness can be worn over shoulders of a firefighter thereby facilitating the firefighter to carry the backpack on the firefighter's back.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
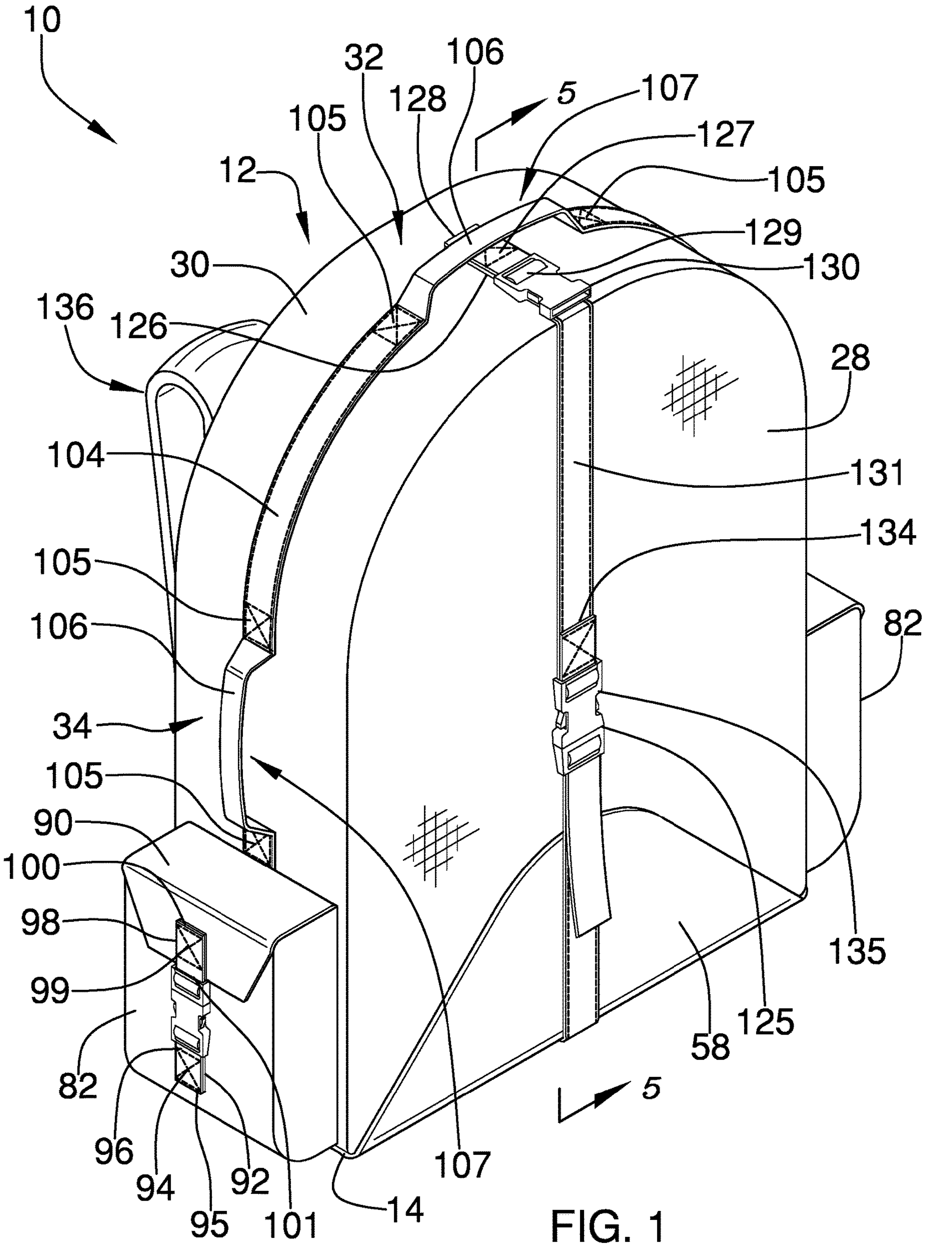
FIG. 1 is a back perspective view of a firehose backpack device according to an embodiment of the disclosure.
Figure 2:
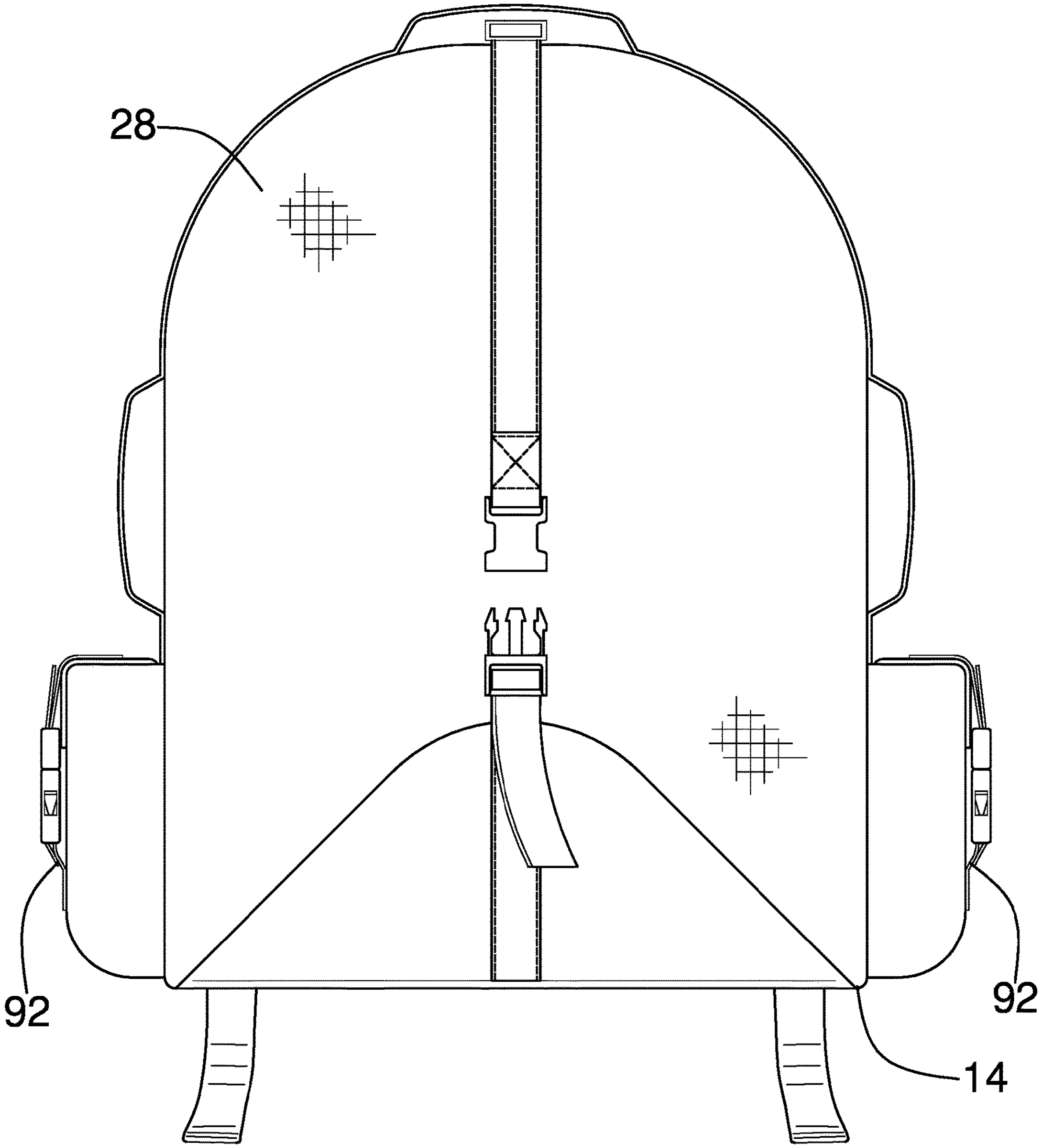
FIG. 2 is a back view of an embodiment of the disclosure.
Figure 3:
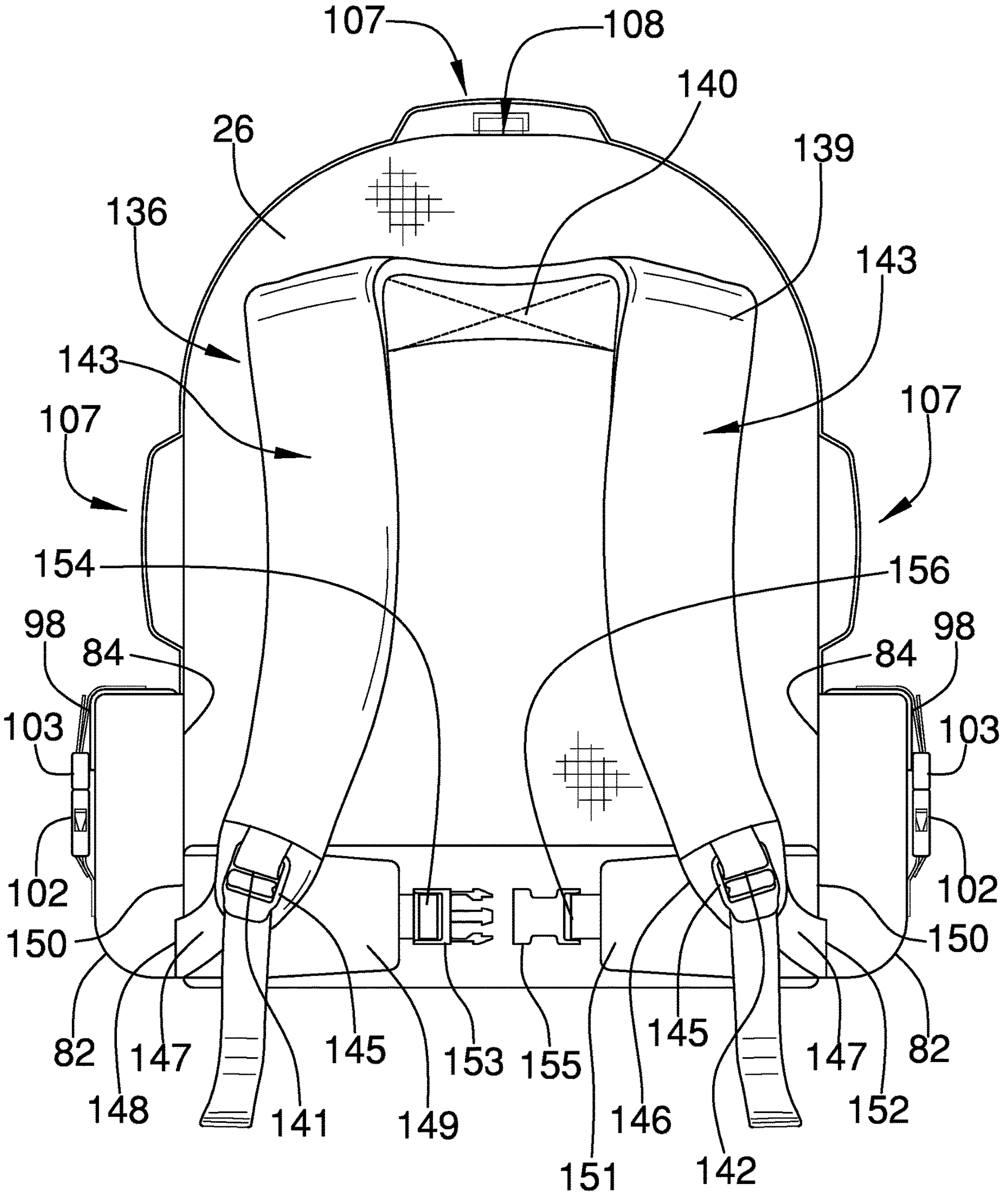
FIG. 3 is a front view of an embodiment of the disclosure.
Figure 4:
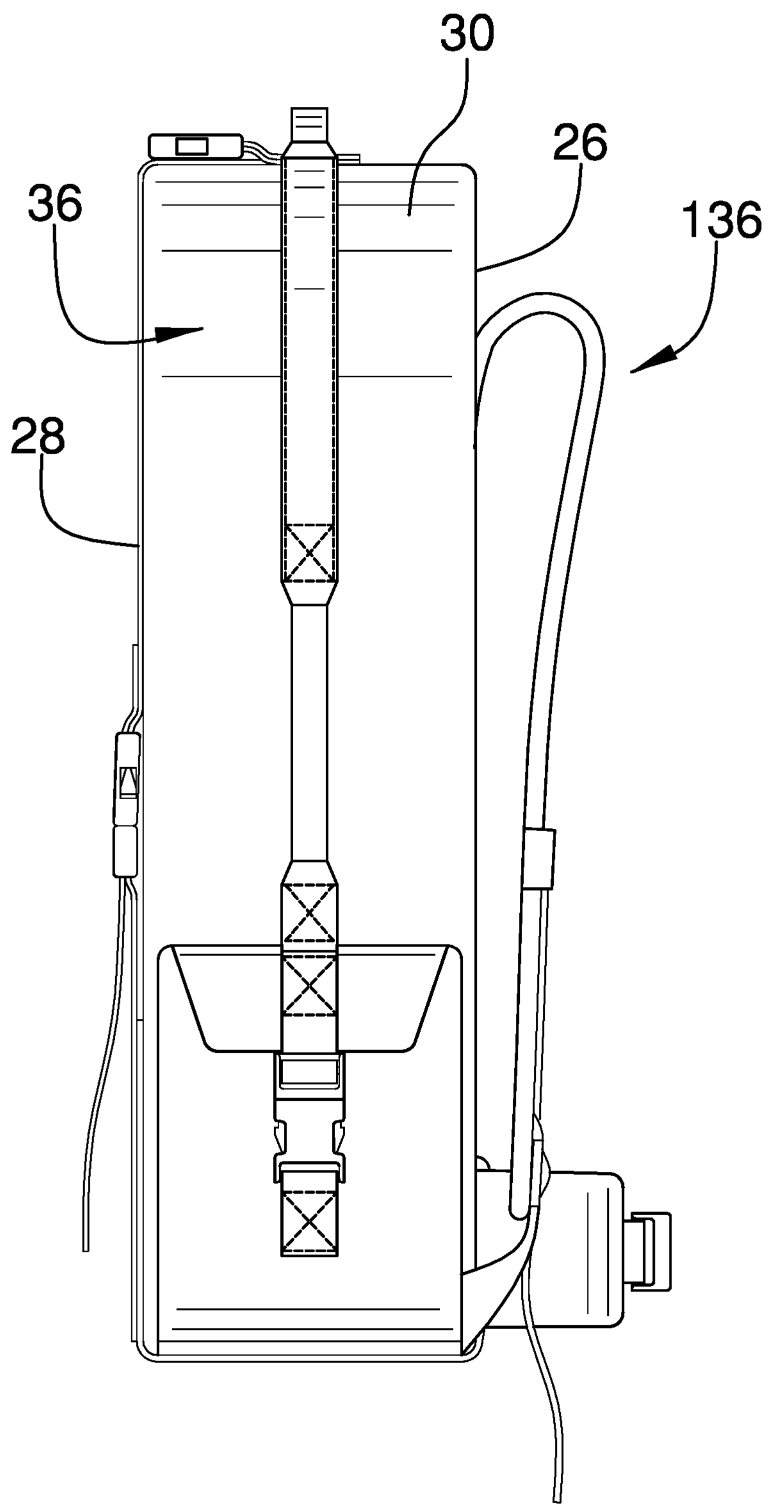
FIG. 4 is a left side view of an embodiment of the disclosure.
Figure 5:
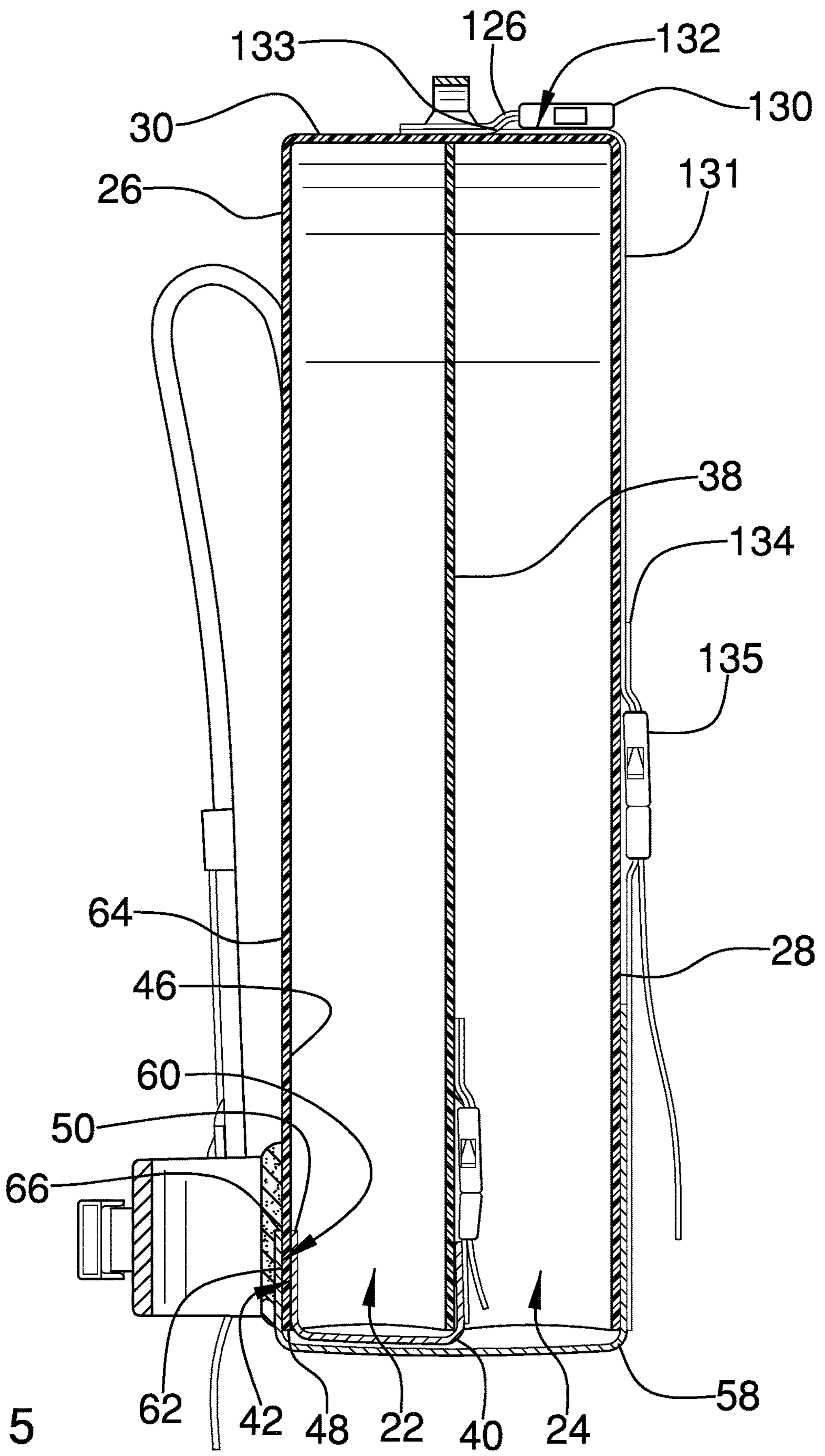
FIG. 5 is a cross sectional view taken along line 5-5 of FIG. 1 of an embodiment of the disclosure.
Figure 6:
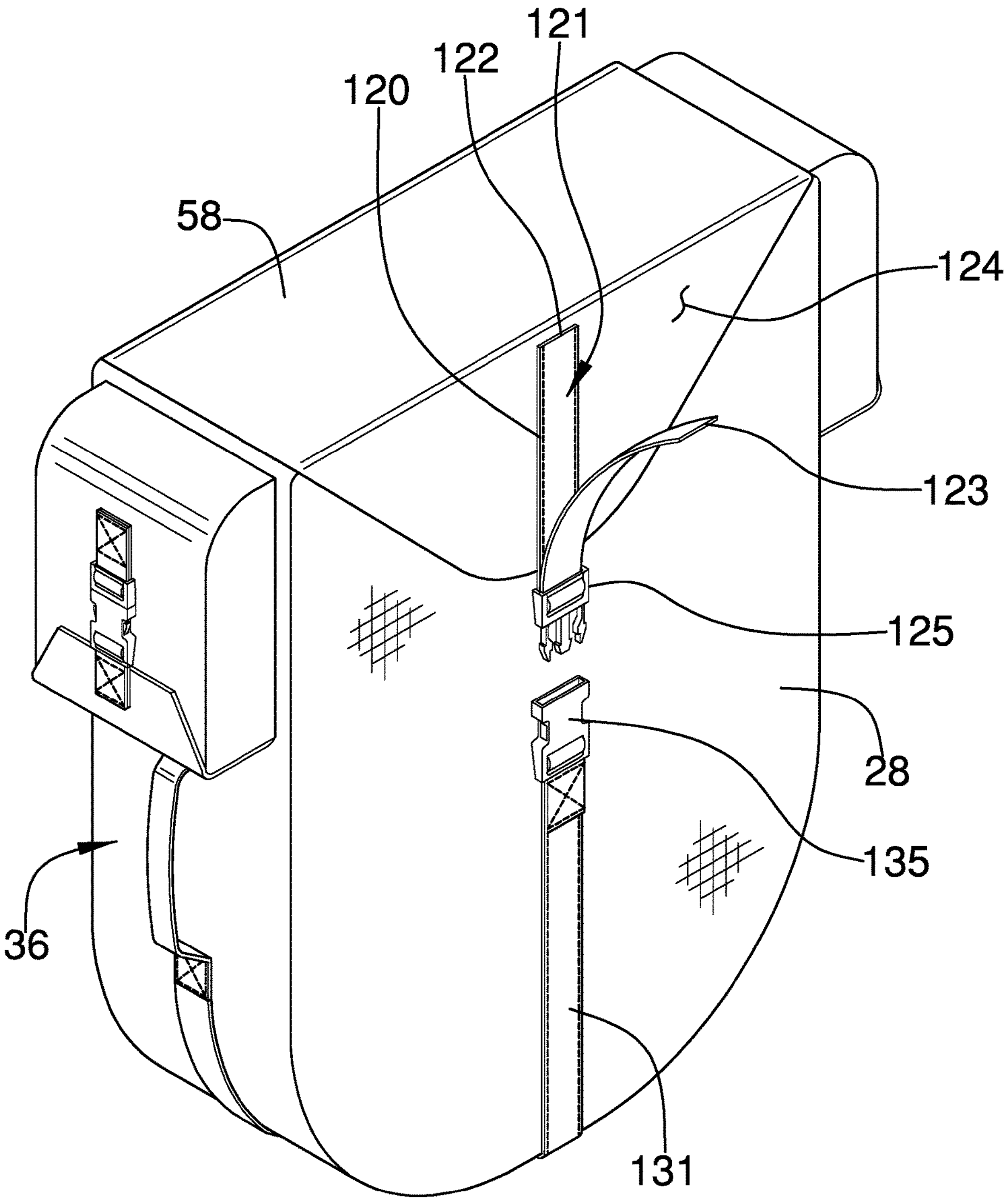
FIG. 6 is a bottom perspective view of an embodiment of the disclosure.
Figure 7:
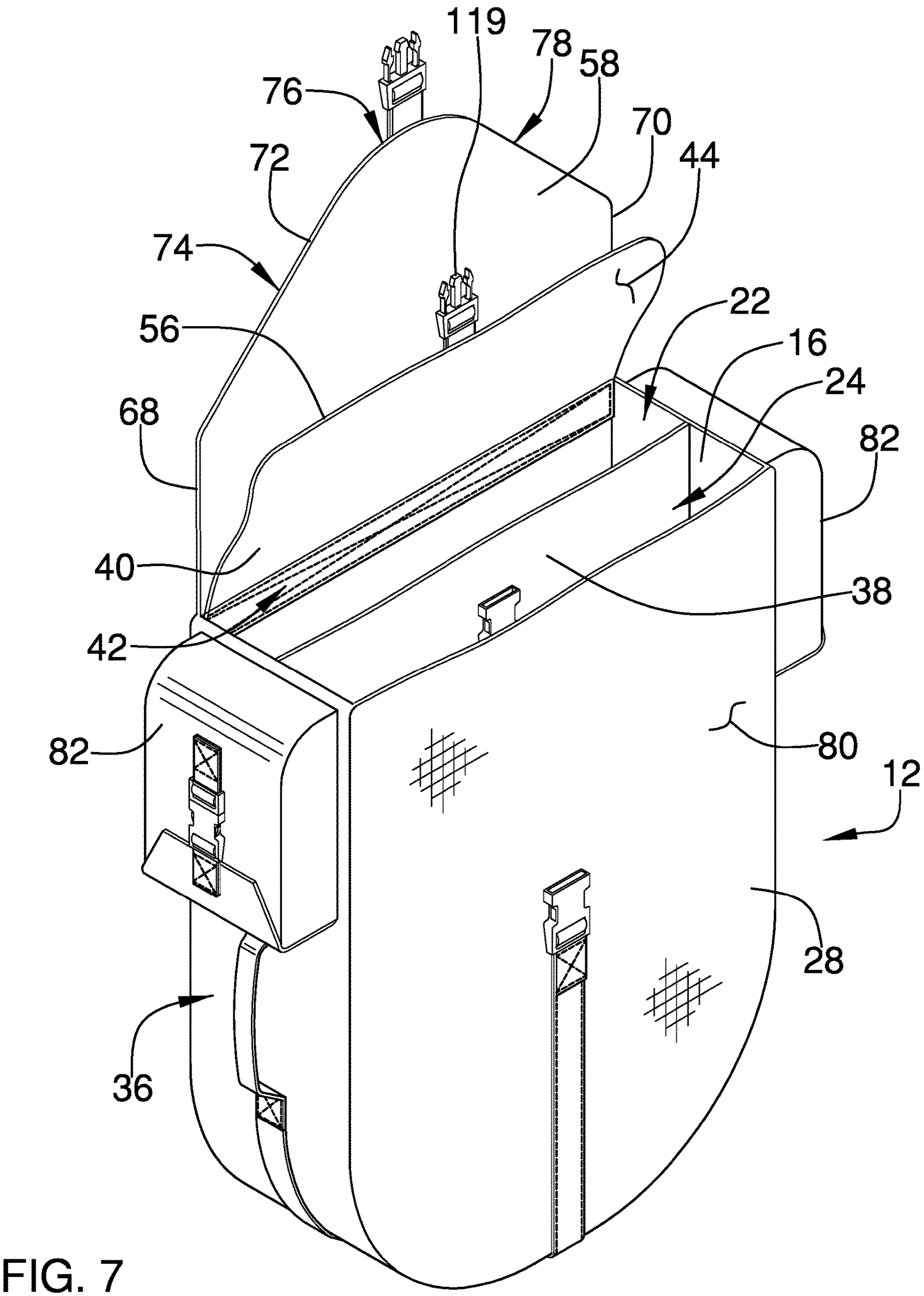
FIG. 7 is a bottom perspective view of an embodiment of the disclosure showing a first flap and a second flap in an open position to expose an interior of a backpack.
Figure 8:
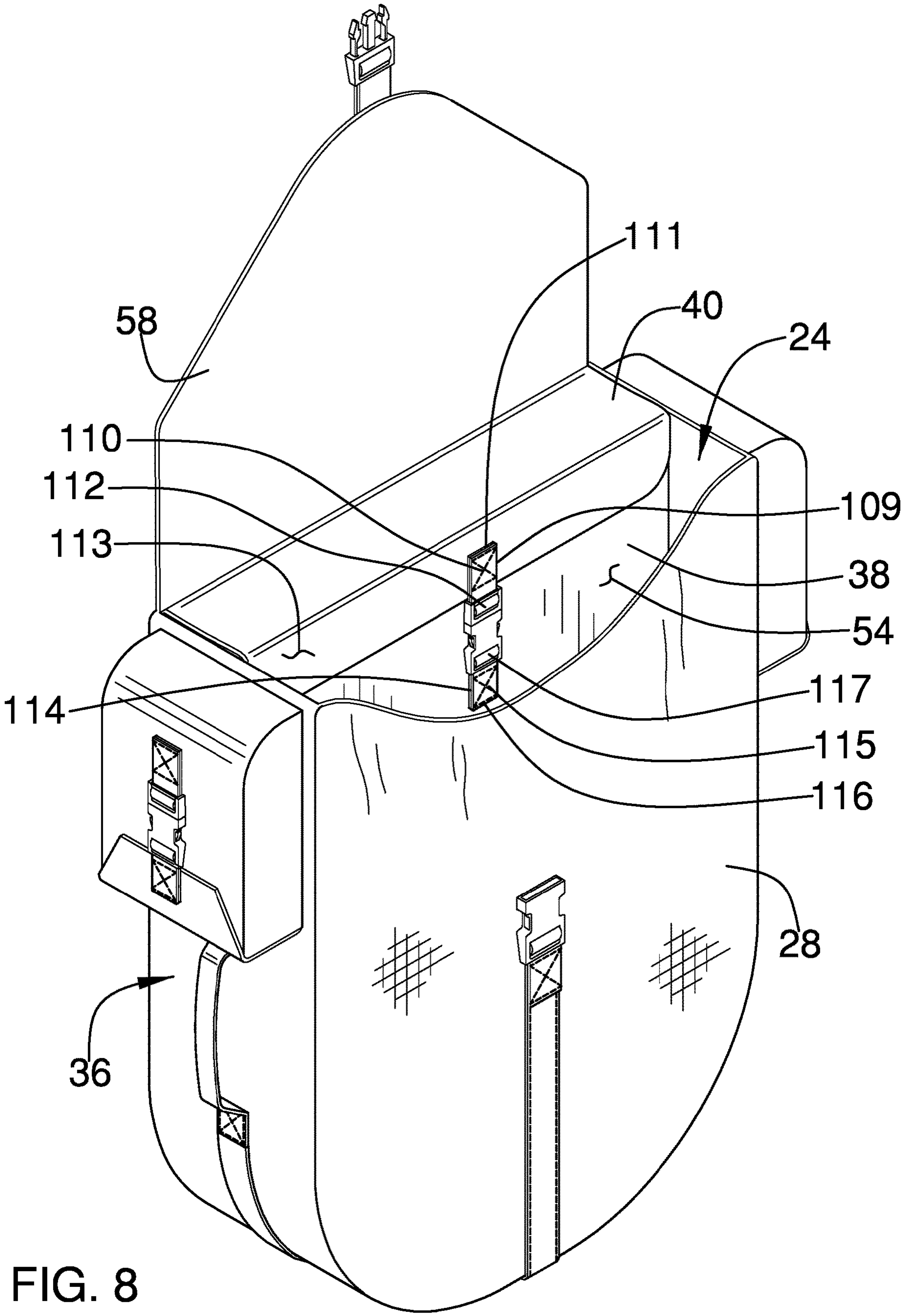
FIG. 8 is a bottom perspective view of an embodiment of the disclosure showing a first flap being closed and a second flap being open.
Figure 9:
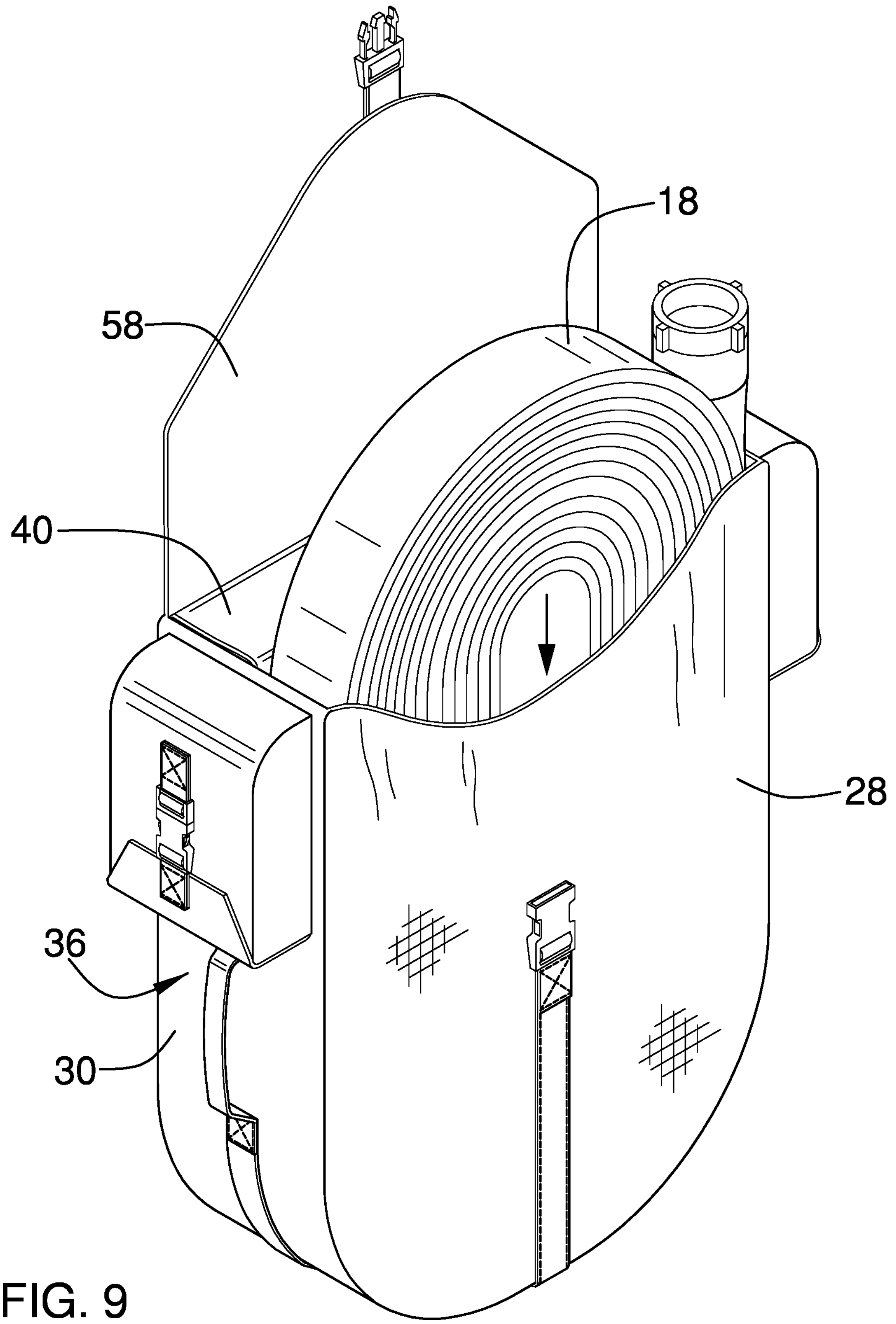
FIG. 9 is a bottom perspective view of an embodiment of the disclosure showing a firehose being inserted into a backpack.
Figure 10:
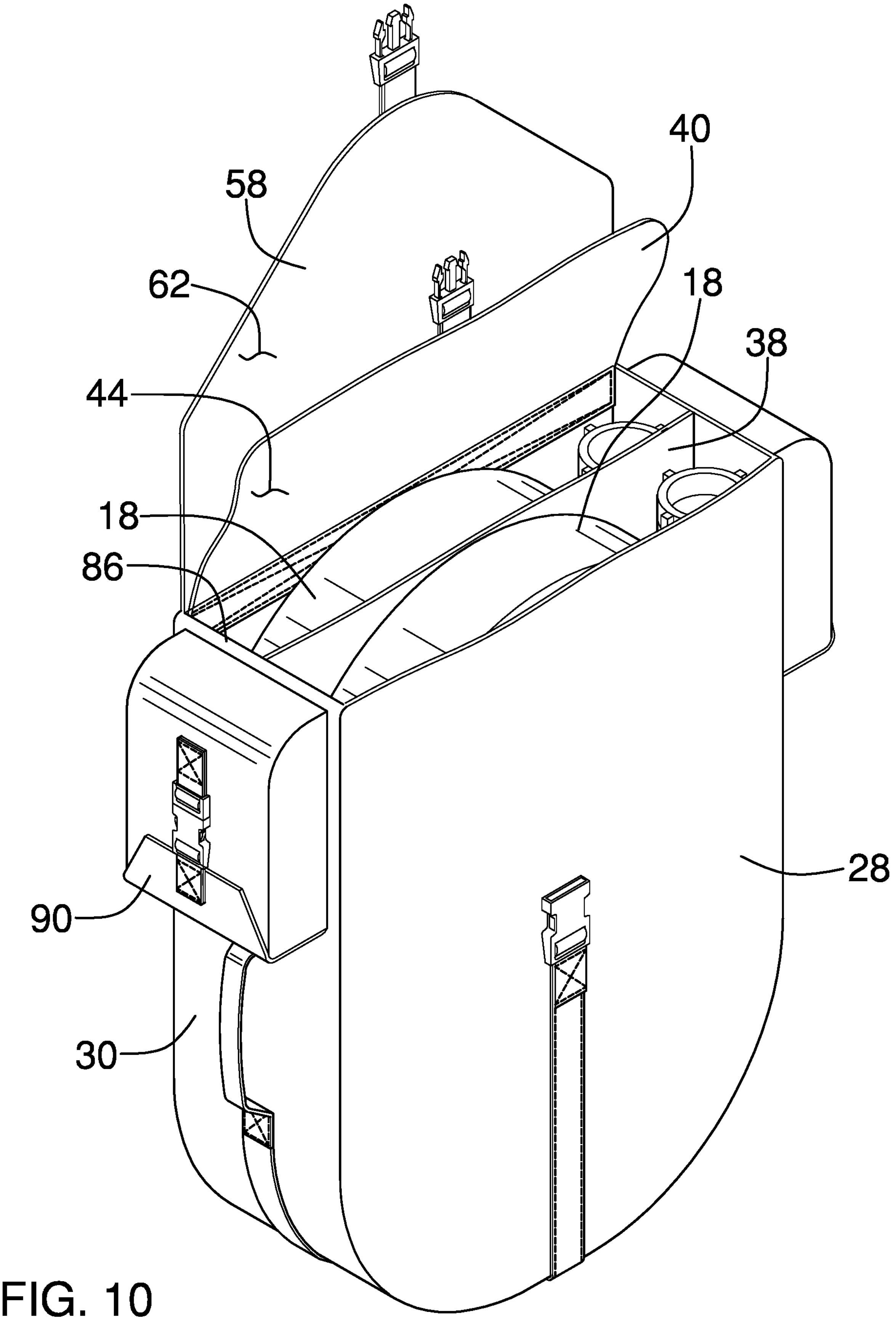
FIG. 10 is a bottom perspective view of an embodiment of the disclosure showing a pair of firehoses being contained in a backpack.
Figure 11:
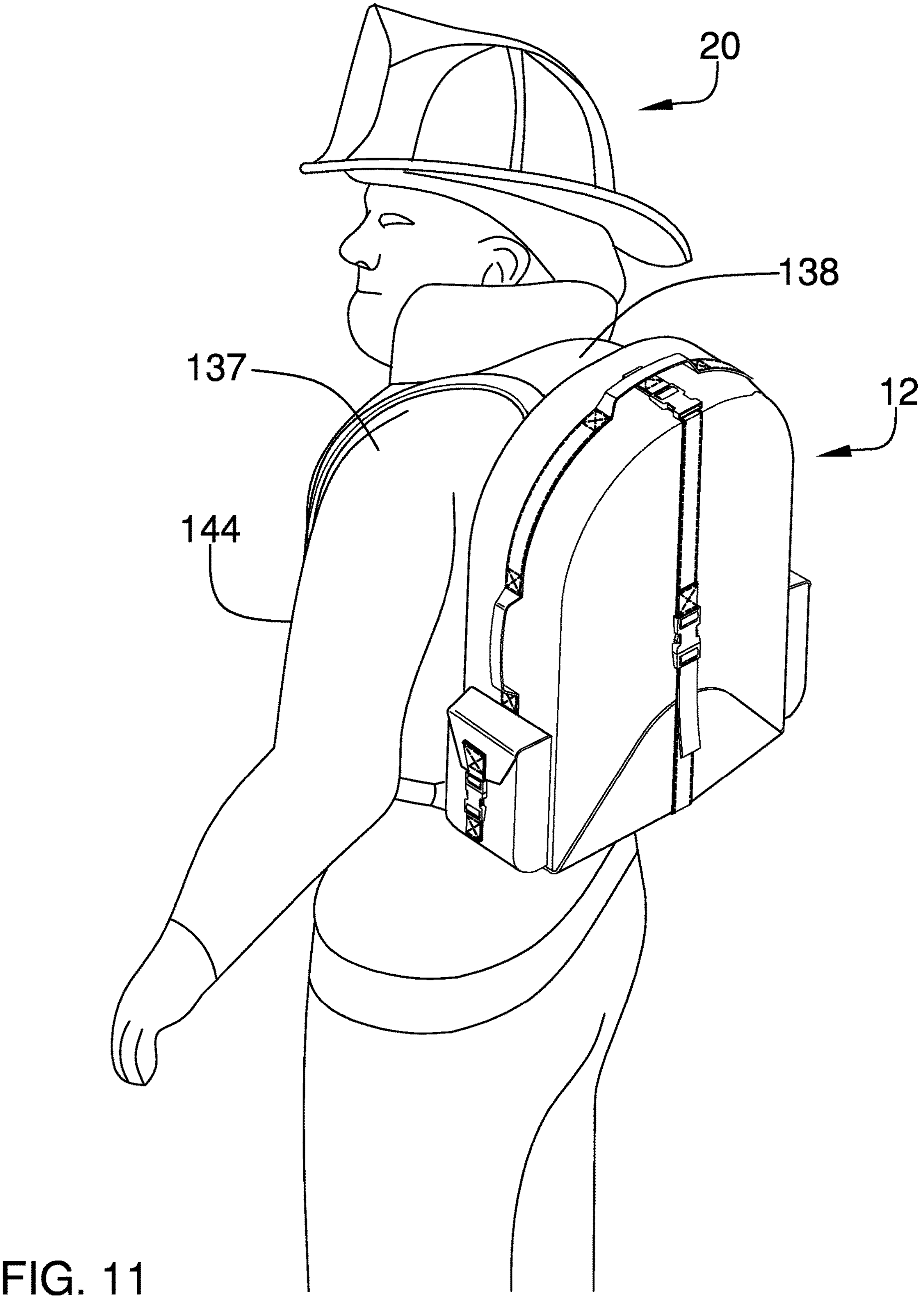
FIG. 11 is a perspective in-use view of an embodiment of the disclosure showing a backpack being worn on a firefighter's back.
Figure 12:
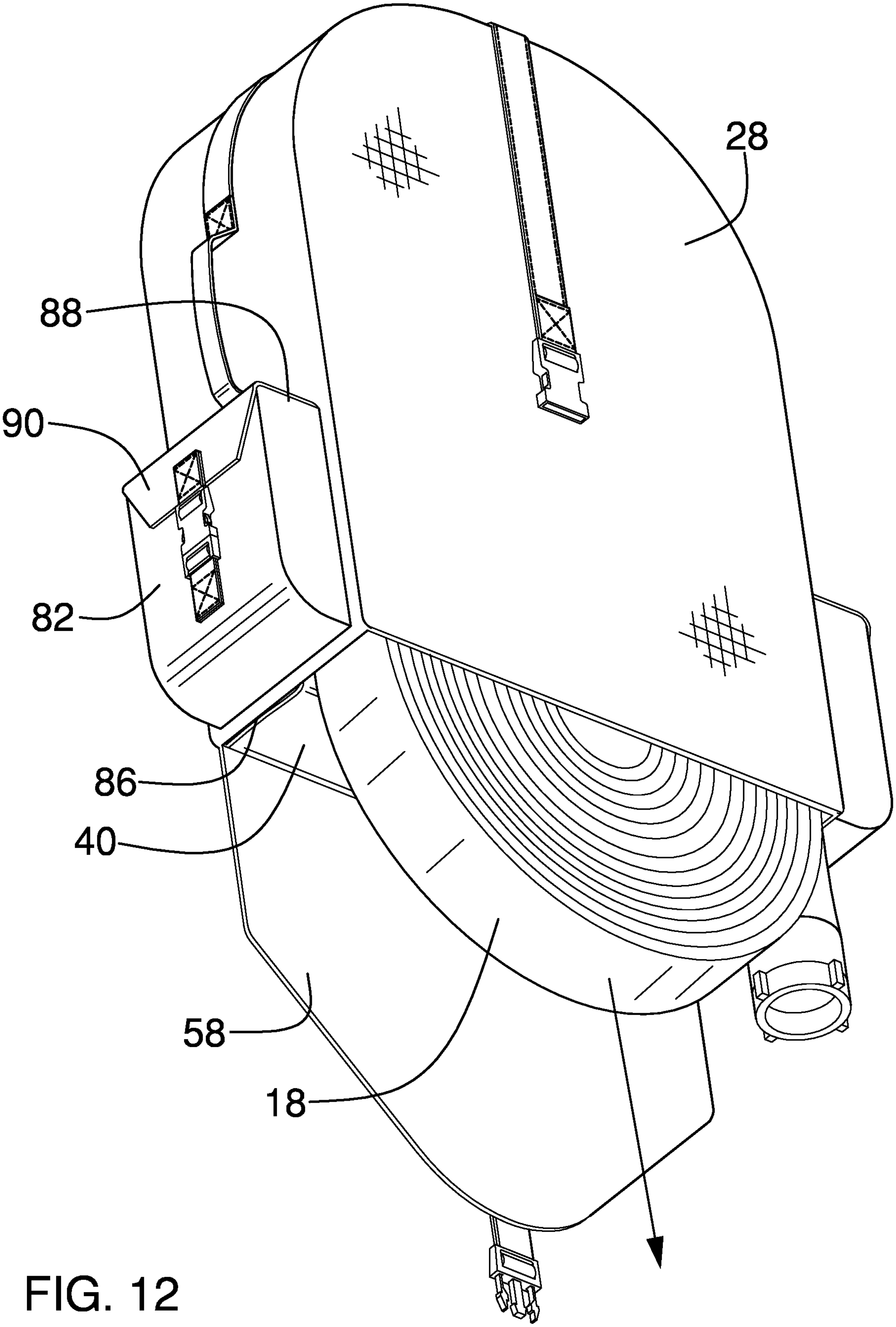
FIG. 12 is a bottom perspective view of an embodiment of the disclosure showing a firehose being removed from a backpack.

With reference now to the drawings, and in particular to FIGS. 1 through 13 thereof, a new backpack device embodying the principles and concepts of an embodiment of the disclosure and generally designated by the reference numeral 10 will be described.

As best illustrated in FIGS. 1 through 13, the firehose backpack device 10 generally comprises a backpack 12 that has a bottom end 14 which is open to access an interior space 16 defined by the backpack 12. The bottom end 14 facilitates fire hoses 18 to be inserted into the interior space 16 for storing the fire hoses 18. The fire hoses 18 may be fire hoses of any conventional length and design that are commonly employed by firefighters 20 to fight fires. The interior space 16 is divided into a first half 22 and a second half 24 and each of the first half 22 and the second half 24 can contain a respective fire hose 18. The backpack 12 has a front wall 26 and a back wall 28 and an outer wall 30 extending between the front wall 26 and the back wall 28; the outer wall 30 has an upper side 32 which curves upwardly between a first lateral side 34 and a second lateral side 36 of the outer wall 30. The backpack 12 has a dividing wall 38 that is positioned in the interior space 16 and the dividing wall 38 is centrally positioned between and is oriented parallel to each of the front wall 26 and the back wall 28 to define the first half 22 of the interior space 16 and the second half 24 of the interior space 16.

A first flap 40 is disposed on the bottom end 14 of the backpack 12 and the first flap 40 is foldable over the first half 22 of the interior space 16 of the backpack 12 for closing the first half 22 to retain the respective fire hose 18 in the first half 22. The first flap 40 has a connection point 42 on a rear surface 44 of the first flap 40 which is bonded to an inside surface 46 of the front wall 26 at a point located adjacent to a bottom edge 48 of the front wall 26. Furthermore, an upper edge 50 of the first flap 40 is spaced upwardly from and extends along a line that is oriented parallel to the bottom edge 48 of the front wall 26 and the connection point 42 extends along a full width of the first flap 40. The first flap 40 is foldable over a lower edge 52 of the dividing wall 38 in the backpack 12 for closing the first half 22 having the first flap 40 extending upwardly along a back surface 54 of the dividing wall 38. Additionally, a lower edge 56 of the first flap 40 is spaced upwardly from and extends along a line is oriented parallel to the lower edge 52 of the dividing wall 38 when the first flap 40 is folded over the lower edge 52 of the dividing wall 38.

A second flap 58 is provided and the second flap 58 is disposed on the bottom end 14 of the backpack 12. Furthermore, the second flap 58 is foldable over the first flap 40 and the second half 24 of the interior space 16 of the backpack 12 for closing the second half 24 to retain the respective fire hose 18 in the second half 24. The second flap 58 has a connection point 60 on a rear surface 62 of the second flap 58 which is bonded to an outside surface 64 of the front wall 26 at a point located adjacent to the bottom edge 48 of the front wall 26. Additionally, an upper edge 66 of the second flap 58 is spaced upwardly from and extends along a line that is oriented parallel to the bottom edge 48 of the front wall 26 and the connection point 60 of the second flap 58 extends along a full width of the second flap 58.

The second flap 58 has a first sidelong edge 68 and a second sidelong edge 70 and a lower edge 72; the lower edge 72 of the second flap 58 has a first angled portion 74 which angles between the first sidelong edge 68 and a curved portion 76 of the lower edge 72 of the second flap 58. The lower edge 72 of the second flap 58 has a second angled portion 78 which angles between the second sidelong edge 70 and the curved portion 76 and the curved portion 76 forms an arc between the first angled portion 74 and the second angled portion 78. Furthermore, the second flap 58 is foldable over the first flap 40 and a bottom edge 48 of the back wall 28 of the backpack 12 having the second flap 58 extending upwardly along an outer surface 80 of the back wall 28 such that the curved portion 76 of the lower edge 72 of the second flap 58 is spaced upwardly from the bottom edge 48 of the back wall 28. The connection point 42 of the first flap 40 and the connection point 60 of the second flap 58 is each defined by stitching which extends through the first flap 40 and the back wall 28 of the backpack 12 and the second flap 58.

A pair of pouches 82 is each attached to the backpack 12 and each of the pair of pouches 82 can contain tools and accessories related to employing fire hoses 18. Additionally, each of the pair of pouches 82 is disposed on opposite sides of the backpack 12 with respect to each other. Each of the pair of pouches 82 has a rear edge 84 that is coupled to a respective one of the first lateral side 34 and the second lateral side 36 of the outer wall 30 of the backpack 12 at a point that is located adjacent to a lower edge 86 of the outer wall 30. Additionally, each of the pair of pouches 82 has an upper end 88 that is open into an interior of a respective pouch 82. Each of the pair of pouches 82 includes a flap 90 that is foldable over the upper end 88 of a respective pouch 82 for closing the upper end 88 of the respective pouch 82.

The backpack 12 and the first flap 40 and the second flap 58 and each of the pair of pouches 82 is comprised of a fluid impermeable material, including but not being limited to rubberized canvas or treated nylon or other type of resilient textile that has been treated to resist penetration of fluids. In this way the backpack 12 can protect the firehoses 18 against exposure to the elements as well as protect the firehoses 18 from exposure to potentially damaging chemical agents. Furthermore, the backpack 12 and the first flap 40 and the second flap 58 and each of the pair of pouches 82 is comprised of a resilient material which has a tensile strength that is sufficient to support the weight of at least 60.0 meters of firehose 18 along with the weight of the tools and accessories commonly employed with firehose 18.

A pair of first pocket straps 92 is provided and each of the first pocket straps 92 has a first pocket connection point 94 extending from a first end 95 of a respective first pocket strap 92 toward a second end 96 of the respective first pocket strap 92. The first pocket connection point 94 comprises stitching extending through the first pocket straps 92 and a front wall 97 of a respective one of the pair of pouches 82. A pair of second pocket straps 98 is provided and each of the pair of second pocket straps 98 has a second pocket connection point 99 extending from a first end 100 of a respective second pocket strap 98 toward a second end 101 of the respective second pocket strap 98. The second pocket connection point 99 comprises stitching extending through the second pocket straps 98 and the flap 90 of a respective one of the pair of pouches 82.

A pair of first pocket couplers 102 is each movably disposed on a respective one of the pair of first pocket straps 92 proximate the first end 95 of the respective first pocket strap 92. A pair of second pocket couplers 103 is each movably disposed on a respective one of the pair of second pocket straps 98 proximate the second end 101 of the respective second pocket strap 98. Each of the pair of first pocket couplers 102 is releasably matable to a respective one of the pair of second pocket couplers 103 for closing the flap 90 on the respective pouch 82. Each of the second pocket couplers 103 and the first pocket couplers 102 may comprise complementary portions of a release buckle or other type of releasable mechanical coupler.

A carrying strap 104 is positioned on the outer wall 30 of the backpack 12 and the carrying strap 104 extends between each of the pair of pouches 82. The carrying strap 104 has a plurality of connection points 105 which are spaced apart from each other and are distributed along the carrying strap 104 thereby defining a plurality of free portions 106 of the carrying strap 104. The free portions 106 are spaced from the outer wall 30 such that each of the free portions 106 defines a respective one of a plurality of handles 107 on the carrying strap 104 which each curves away from the outer wall 30. Furthermore, each of the handles 107 can be gripped for carrying the backpack 12. Each of the plurality of connection points 105 on the carrying strap 104 is defined by stitching which extends through the carrying strap 104 and the outer wall 30 of the backpack 12. The carrying strap 104 is comprised of a resilient material, including but not being limited to nylon or canvas, such that the carrying strap 104 has a breaking strength of no less than 2000.0 kg.

A respective one of the plurality of handles 107 is located on an apex 108 of the upper side 32 of the outer wall 30 such that the handle 107 on the apex 108 of the upper side 32 of the outer wall 30 facilitates the backpack 12 to be carried in an upright position. Each of a respective pair of the plurality of handles 107 is located on a respective one of the first lateral side 34 and the second lateral side 36 of the outer wall 30 at a point that is located above a respective one of the pair of pouches 82. Each of the pair of handles 107 on the respective first lateral side 34 or the second lateral side 36 facilitates the backpack 12 to be carried on its side.

A first strap 109 is provided which has a first connection point 110 extending from a first end 111 of the first strap 109 toward a second end 112 of the first strap 109. The first connection point 110 comprises stitching extending through the first strap 109 and a front surface 113 of the first flap 40. A second strap 114 is provided which has a second connection point 115 extending from a first end 116 of the second strap 114 toward a second end 117 of the second strap 114. The second connection point 115 comprises stitching extending through the second strap 114 and the back surface 54 of the dividing wall 38.

A first coupler 118 is movably disposed on the first strap 109 such that the first coupler 118 is located proximate the second end 112 of the first strap 109. A second coupler 119 is movably disposed on the second strap 114 such that the second coupler 119 is located proximate the second end 117 of the second strap 114. The first coupler 118 is releasably matable to the second coupler 119 for securing the first flap 40 over the first half 22 of the interior space 16 of the backpack 12 to retain the respective fire hose 18 in the first half 22 of the interior space 16. Each of the first coupler 118 and the second coupler 119 may comprise complementary portions of a release buckle or other type of releasable mechanical coupler.

A third strap 120 is provided which has a third connection point 121 extending from a first end 122 of the third strap 120 toward a second end 123 of the third strap 120. The third connection point 121 comprises stitching extending through the third strap 120 and a front surface 124 of the second flap 58 such that the third strap 120 extends beyond the curved portion 76 of the lower edge 72 of the second flap 58. A third coupler 125 is movably disposed on the third strap 120 such that the third coupler 125 is located proximate the second end 123 of the third strap 120. A fourth strap 126 is provided which has a fourth connection point 127 extending from a first end 128 of the fourth strap 126 toward a second end 129 of the fourth strap 126. The fourth connection point 127 comprises stitching extending through the fourth strap 126 and upper side 32 of the outer wall 30 of the backpack 12 having the fourth strap 126 being located on the apex 108 of the of the upper side 32 of the outer wall 30 of the backpack 12. A fourth coupler 130 is movably disposed on the fourth strap 126 such that the fourth coupler 130 is located proximate the second end of the fourth strap 126.

A fifth strap 131 is provided which has a fifth connection point 132 extending from a first end 133 of the fifth strap 131 toward a second end 134 of the fifth strap 131. The fifth connection point 132 comprises stitching extending through the fifth strap 131 and the upper side 32 of the outer wall 30 of the backpack 12. Furthermore, the fifth strap 131 is aligned with the fourth strap 126 having the fifth strap 131 extending downwardly along the back wall 28 of the backpack 12. A fifth coupler 135 is movably disposed on the fifth strap 131 such that the fifth coupler 135 is located proximate the second end of the fifth strap 131.

Figure 13:
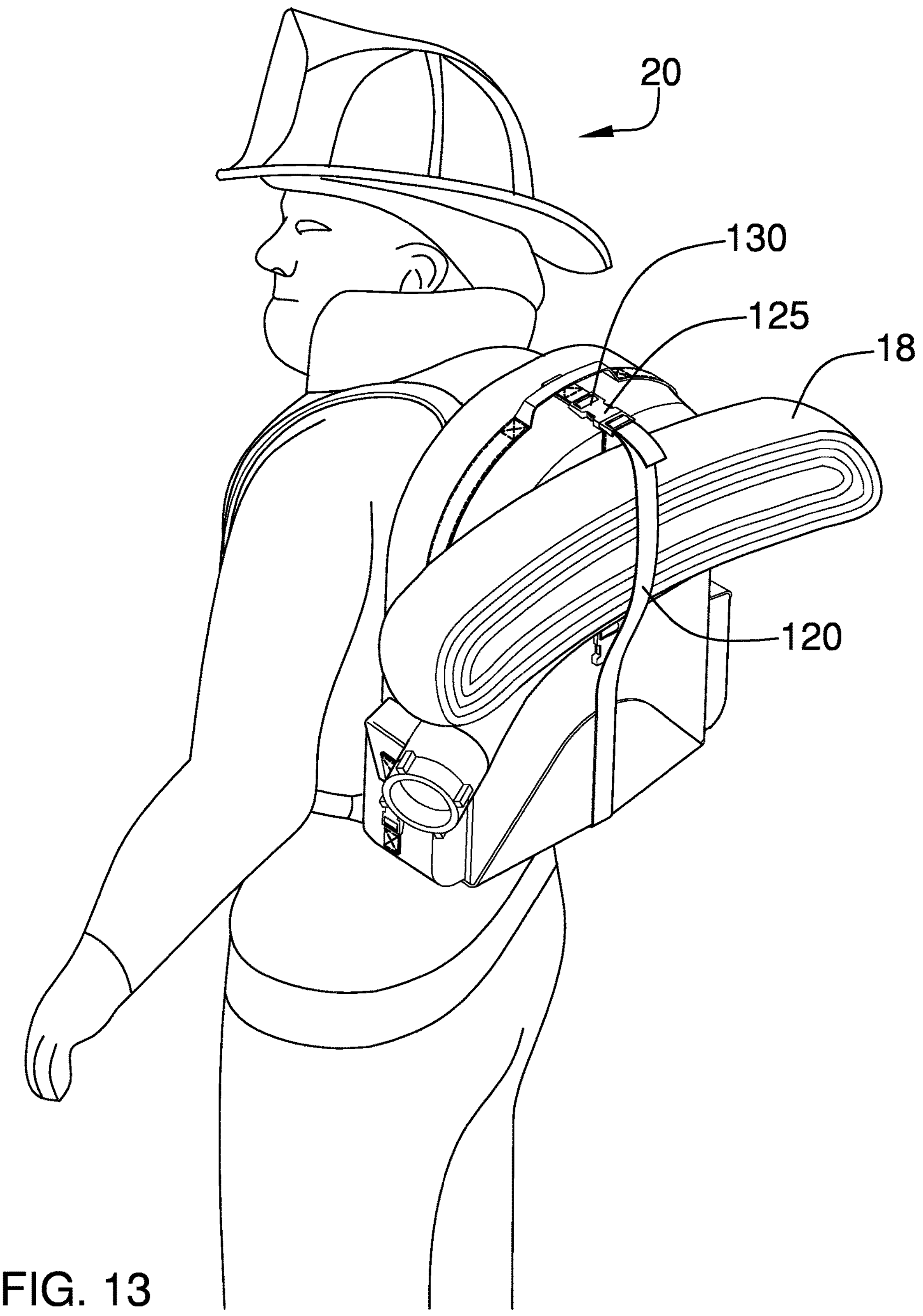
FIG. 13 is a perspective in-use view of an embodiment of the disclosure showing a firehose being secured to a backpack.

The fifth coupler 135 is releasably matable to the third coupler 125 for attaching the fifth strap 131 to the third strap 120 for securing the second flap 58 over the first flap 40 and the second half 24 of the interior space 16 of the backpack 12. In this way each of the fifth coupler 135 and the third coupler 125 retain the respective fire hose 18 in the second half 24 of the interior space 16. Each of the fifth coupler 135 and the third coupler 125 may comprise complementary portions of a release buckle or other type of releasable mechanical coupler. Furthermore, as shown in FIG. 13, the third coupler 125 is releasably matable to the fourth coupler 130 in lieu of being releasably matable to the fifth coupler 135 such that the third strap 120 extends upwardly along a full height of the back wall 28 of the backpack 12. In this way each of the third strap 120 and the fourth strap 126 can secure a respective fire hose 18 to the back wall 28 of the backpack 12 thereby facilitating the respective fire hose 18 on the back wall 28 to be transported for subsequent use. Each of the first strap 109, the second strap 114, the third strap 120, the fourth strap 126, the fifth strap 131, the first pocket straps 92 and the second pocket straps 98 is comprised of a resilient material, including but not being limited to nylon or canvas, which has a breaking strength of no less than 2000.0 kg. Furthermore, each of the first connection point 110, the second connection point 115, the third connection point 121, the fourth connection point 127, the fifth connection point 132, the first pocket connection point 94, the second pocket connection point 99 and the connection points 105 of the carrying strap 104 comprises double stitched webbing which has a width ranging between approximately 2.5 cm and 4.0 cm.

A shoulder harness 136 is attached to the backpack 12 and the shoulder harness 136 can be worn over shoulders 137 of a firefighter 20 thereby facilitating the firefighter 20 to carry the backpack 12 on the firefighter's back 138. The shoulder harness 136 comprises a shoulder strap 139 that has a shoulder connection point 140 which is centrally located between a first end 141 of the shoulder strap 139 and a second end 142 of the shoulder strap 139. The shoulder connection point 140 comprises stitching extending through the shoulder strap 139 and the front wall 26 of the backpack 12. Furthermore, the shoulder connection point 140 extends laterally along the front wall 26 to define a pair of shoulder portions 143 of the shoulder strap 139 extending downwardly along the front wall 26. In this way each of the pair of shoulder portions 143 can extend downwardly along the firefighter's chest 144 when the shoulder harness 136 is worn over the firefighter's shoulders 137. The shoulder strap

139 is padded to enhance comfort for the firefighter 20 when the backpack 12 is loaded with the firehoses 18 and is worn on the firefighter's back 138.

The shoulder harness 136 includes a pair of shoulder buckles 145 and each of the pair of shoulder buckles 145 is attached to a respective one of the pair of shoulder portions 143 having each of the pair of shoulder buckles 145 being located adjacent to a distal end 146 of the respective shoulder portion 143. The shoulder harness 136 includes a pair of lower shoulder straps 147 and each of the pair of lower shoulder straps 147 has a coupled end 148 that is coupled to the front wall 26 of the backpack 12 at a point located adjacent to a respective one of the first lateral side 34 and the second lateral side 36 of the outer wall 30 of the backpack 12. Additionally, each of the pair of lower shoulder straps 147 extends through a respective one of the pair of shoulder buckles 145 for adjusting a length of the shoulder harness 136.

The shoulder harness 136 includes a first waist belt 149 which has a coupled end 150 that is attached to the front wall 26 of the backpack 12 at a point located adjacent to the first lateral side 34 of the outer wall 30 of the backpack 12. The shoulder harness 136 includes a second waist belt 151 which has a coupled end 152 that is attached to the front wall 26 of the backpack 12 at a point located adjacent to the second lateral side 36 of the outer wall 30 of the backpack 12. Additionally, the shoulder harness 136 includes a first waist coupler 153 that is attached to a free end 154 of the first waist belt 149 and a second waist coupler 155 that is attached to a free end 156 of the second waist belt 151. The first waist coupler 153 is releasably matable to the second waist coupler 155 to retain the first waist belt 149 and the second waist belt 151 around a waist 157 of the firefighter 20. Each of the first waist coupler 153 and the second waist coupler 155 may comprise complementary portions of a release buckle or other type of releasable mechanical coupler. Additionally, each of the first waist belt 149 and the second waist belt 151 are padded to enhance comfort for the firefighter 20.

In use, each of the firehoses 18 is loaded into the first half 22 and the second half 24 of the interior space 16 of the backpack 12 and each of the first flap 40 and the second flap 58 is secured in the closed position to retain the firehoses 18 in the backpack 12. In this way the firefighter 20 can transport the firehoses 18 in a hands free manner by wearing the backpack 12 on their back 138 to facilitate the firehoses 18 to be carried downstream from a fire engine. Thus, the firehoses 18 can be deployed to transport water from the fire engine. An expired firehose 18 can be secured to the backpack 12 with the third strap 120 and the fourth strap 126 to facilitate the expired firehose 18 to be transported back to the fire engine rather than placing the expired firehose 18 inside of the backpack 12. Additionally, any of the handles 107 defined on the carrying strap 104 can be gripped for carrying the backpack 12 rather than wearing the backpack 12 for transporting the firehoses 18.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A firehose backpack device for carrying a plurality of firehoses on a firefighter's back, said device comprising:

a backpack having a bottom end being open to access an interior space defined by said backpack wherein said bottom end is configured to facilitate fire hoses to be inserted into said interior space for storing the fire hoses, said interior space being divided into a first half and a second half wherein each of said first half and said second half is configured to contain a respective fire hose;

a first flap being disposed on said bottom end of said backpack, said first flap being foldable over said first half of said interior space of said backpack for closing said first half wherein said first flap is configured to retain the respective fire hose in said first half;

a second flap being disposed on said bottom end of said backpack, said second flap being foldable over said first flap and said second half of said interior space of said backpack for closing said second half wherein said second flap is configured to retain the respective fire hose in said second half;

a pair of pouches, each of said pair of pouches being attached to said backpack wherein each of said pair of pouches is configured to contain tools and accessories related to employing fire hoses, each of said pair of pouches being disposed on opposite sides of said backpack with respect to each other; and a shoulder harness being attached to said backpack wherein said shoulder harness is configured to be worn over shoulders of a firefighter thereby facilitating the firefighter to carry said backpack on the firefighter's back.

2. The assembly according to claim 1, wherein:

said backpack has a front wall and a back wall and an outer wall extending between said front wall and said back wall;

said outer wall has an upper side which curves upwardly between a first lateral side and a second lateral side of said outer wall;

said backpack has a dividing wall being positioned in said interior space;

said dividing wall is centrally positioned between and being oriented parallel to each of said front wall and said back wall to define said first half of said interior space and said second half of said interior space;

said first flap has a connection point on a rear surface of said first flap which is bonded to an inside surface of said front wall at a point located adjacent to a bottom edge of said front wall such that an upper edge of said first flap is spaced upwardly from and extends along a line being oriented parallel to said bottom edge of said front wall;

said connection point extends along a full width of said first flap;

said second flap has a connection point on a rear surface of said second flap which is bonded to an outside surface of said front wall at a point located adjacent to said bottom edge of said front wall such that an upper edge of said second flap is spaced upwardly from and extends along a line being oriented parallel to said bottom edge of said front wall; and said connection point of said second flap extends along a full width of said second flap.

3. The assembly according to claim 2, wherein said first flap is foldable over a lower edge of said dividing wall in said backpack for closing said first half having said first flap extending upwardly along a back surface of said dividing wall such that a lower edge of said first flap is spaced upwardly from and extends along a line being oriented parallel to said lower edge of said dividing wall.

4. The assembly according to claim 2, wherein:

said second flap has a first sidelong edge and a second sidelong edge and a lower edge;

said lower edge of said second flap has a first angled portion which angles between said first sidelong edge and a curved portion of said lower edge of said second flap;

said lower edge of said second flap has a second angled portion which angles between said second sidelong edge and said curved portion;

said curved portion forms an arc between said first angled portion and said second angled portion;

said second flap is foldable over said first flap and a bottom edge of said back wall of said backpack having said second flap extending upwardly along an outer surface of said back wall such that said curved portion of said lower edge of said second flap is spaced upwardly from said bottom edge of said back wall; and said connection point of said first flap and said connection point of said second flap is each defined by stitching which extends through said first flap and said back wall of said backpack and said second flap.

5. The assembly according to claim 2, wherein:

each of said pair of pouches has a rear edge being coupled to a respective one of said first lateral side and said second lateral side of said outer wall of said backpack at a point being located adjacent to a lower edge of said outer wall;

each of said pair of pouches has an upper end being open into an interior of a respective pouch;

each of said pair of pouches includes a flap being foldable over said upper end of a respective pouch for closing said upper end of said respective pouch;

said device includes a pair of first pocket straps;

each of said first pocket straps has a first pocket connection point extending from a first end of a respective first pocket strap toward a second end of said respective first pocket strap;

said first pocket connection point comprises stitching extending through said first pocket straps and a front wall of a respective one of said pair of pouches;

said device includes a pair of second pocket straps;

each of said pair of second pocket straps has a second pocket connection point extending from a first end of a respective second pocket strap toward a second end of said respective second pocket strap;

said second pocket connection point comprises stitching extending through said second pocket straps and said flap of a respective one of said pair of pouches;

said device includes a pair of first pocket couplers;

each of said pair of first pocket couplers is movably disposed on a respective one of said pair of first pocket straps proximate said first end of said respective first pocket strap;

said device includes a pair of second pocket couplers;

each of said pair of second pocket couplers is movably disposed on a respective one of said pair of second pocket straps proximate said second end of said respective second pocket strap; and each of said pair of first pocket couplers is releasably matable to a respective one of said pair of second pocket couplers for closing said flap on said respective pouch.

6. The assembly according to claim 2, wherein:

said device includes a carrying strap being positioned on said outer wall of said backpack;

said carrying strap extends between each of said pair of pouches;

said carrying strap has a plurality of connection points being spaced apart from each other and being distributed along said carrying strap thereby defining a plurality of free portions of said carrying strap which are spaced from said outer wall such that each of said free portions defines a respective one of a plurality of handles on said carrying strap which each curves away from said outer wall wherein said each of said handles is configured to be gripped for carrying said backpack;

each of said plurality of connection points on said carrying strap is defined by stitching which extends through said carrying strap and said outer wall of said backpack;

a respective one of said plurality of handles is located on an apex of said upper side of said outer wall wherein said handle on said apex of said upper side of said outer wall is configured to facilitate said backpack to be carried in an upright position; and each of a respective pair of said plurality of handles is located on a respective one of said first lateral side and said second lateral side of said outer wall at a point being located above a respective one of said pair of pouches wherein each of said pair of handles on said respective first lateral side or said second lateral side is configured to facilitate said backpack to be carried on its side.

7. The assembly according to claim 2, wherein:

said device includes a first strap having a first connection point extending from a first end of said first strap toward a second end of said first strap;

said first connection point comprises stitching extending through said first strap and a front surface of said first flap; and said device includes a first coupler being movably disposed on said first strap such that said first coupler is located proximate said second end of said first strap;

said device includes a second strap having a second connection point extending from a first end of said second strap toward a second end of said second strap;

said second connection point comprises stitching extending through said second strap and said back surface of said dividing wall;

said device includes a second coupler being movably disposed on said second strap such that said second coupler is located proximate said second end of said second strap; and said first coupler is releasably matable to said second coupler for securing said first flap over said first half of said interior space of said backpack wherein each of said first coupler and said second coupler are configured to retain the respective fire hose in said first half of said interior space.

8. The assembly according to claim 7, wherein:

said device includes a third strap having a third connection point extending from a first end of said third strap toward a second end of said third strap;

said third connection point comprises stitching extending through said third strap and a front surface of said second flap such that said third strap extends beyond said curved portion of said lower edge of said second flap;

said device includes a third coupler being movably disposed on said third strap such that said third coupler is located proximate said second end of said third strap;

said device includes a fourth strap having a fourth connection point extending from a first end of said fourth strap toward a second end of said fourth strap;

said fourth connection point comprises stitching extending through said fourth strap and upper side of said outer wall of said backpack having said fourth strap being located on said apex of said of said upper side of said outer wall of said backpack; and said device includes a fourth coupler being movably disposed on said fourth strap such that said fourth coupler is located proximate said second end of said fourth strap.

9. The assembly according to claim 8, wherein:

said device includes a fifth strap having a fifth connection point extending from a first end of said fifth strap toward a second end of said fifth strap;

said fifth connection point comprises stitching extending through said fifth strap and said and upper side of said outer wall of said backpack such that said fifth strap is aligned with said fourth strap having said fifth strap extending downwardly along said back wall of said backpack;

said device includes a fifth coupler being movably disposed on said fifth strap such that said fifth coupler is located proximate said second end of said fifth strap; and said fifth coupler is releasably matable to said third coupler for attaching said fifth strap to said third strap for securing said second flap over said first flap and said second half of said interior space of said backpack wherein each of said fifth coupler and said third coupler are configured to retain the respective fire hose in said second half of said interior space.

10. The assembly according to claim 9, wherein said third coupler is releasably matable to said fourth coupler in lieu of being releasably matable to said fifth coupler such that said third strap extends upwardly along a full height of said back wall of said backpack wherein each of said third strap and said fourth strap is configured to secure a respective fire hose to said back wall of said backpack thereby facilitating the respective fire hose on said back wall to be transported for subsequent use.

11. The assembly according to claim 1, wherein:

said shoulder harness includes a shoulder strap having a shoulder connection point being centrally located between a first end of said shoulder strap and a second end of said shoulder strap;

said shoulder connection point comprises stitching extending through said shoulder strap and a front wall of said backpack having said shoulder connection point extending laterally along said front wall to define a pair of shoulder portions of said shoulder strap extending downwardly along said front wall wherein each of said pair of shoulder portions is configured to extend downwardly along the firefighter's chest when said shoulder harness is worn over the firefighter's shoulders;

said shoulder harness includes a pair of shoulder buckles;

each of said pair of shoulder buckles is attached to a respective one of said pair of shoulder portions having each of said pair of shoulder buckles being located adjacent to a distal end of said respective shoulder portion;

said shoulder harness includes a pair of lower shoulder straps, each of said pair of lower shoulder straps having a coupled end being coupled to said front wall of said backpack at a point located adjacent to a respective one of a first lateral side and a second lateral side of an outer wall of said backpack; and each of said pair of lower shoulder straps extends through a respective one of said pair of shoulder buckles for adjusting a length of said shoulder harness.

12. The assembly according to claim 1, wherein:

said shoulder harness includes a first waist belt having a coupled end being attached to a front wall of said backpack at a point located adjacent to a first lateral side of an outer wall of said backpack;

said shoulder harness includes a second waist belt having a coupled end being attached to said front wall of said backpack at a point located adjacent to a second lateral side of said outer wall of said backpack;

said shoulder harness includes a first waist coupler being attached to a free end of said first waist belt;

said shoulder harness includes a second waist coupler being attached to a free end of said second waist belt; and said first waist coupler is releasably matable to said second waist coupler wherein each of said first waist coupler and said second waist coupler are configured to retain said first waist belt and said second waist belt around a waist of the firefighter.

13. A firehose backpack device for carrying a plurality of firehoses on a firefighter's back, said device comprising:

a backpack having a bottom end being open to access an interior space defined by said backpack wherein said bottom end is configured to facilitate fire hoses to be inserted into said interior space for storing the fire hoses, said interior space being divided into a first half and a second half wherein each of said first half and said second half is configured to contain a respective fire hose, said backpack having a front wall and a back wall and an outer wall extending between said front wall and said back wall, said outer wall having an upper side which curves upwardly between a first lateral side and a second lateral side of said outer wall, said backpack having a dividing wall being positioned in said interior space, said dividing wall being centrally positioned between and being oriented parallel to each of said front wall and said back wall to define said first half of said interior space and said second half of said interior space;

a first flap being disposed on said bottom end of said backpack, said first flap being foldable over said first half of said interior space of said backpack for closing said first half wherein said first flap is configured to retain the respective fire hose in said first half, said first flap having a connection point on a rear surface of said first flap which is bonded to an inside surface of said front wall at a point located adjacent to a bottom edge of said front wall such that an upper edge of said first flap is spaced upwardly from and extends along a line being oriented parallel to said bottom edge of said front wall, said connection point extending along a full width of said first flap, said first flap being foldable over a lower edge of said dividing wall in said backpack for closing said first half having said first flap extending upwardly along a back surface of said dividing wall such that a lower edge of said first flap is spaced upwardly from and extends along a line being oriented parallel to said lower edge of said dividing wall;

a second flap being disposed on said bottom end of said backpack, said second flap being foldable over said first flap and said second half of said interior space of said backpack for closing said second half wherein said second flap is configured to retain the respective fire hose in said second half, said second flap having a connection point on a rear surface of said second flap which is bonded to an outside surface of said front wall at a point located adjacent to said bottom edge of said front wall such that an upper edge of said second flap is spaced upwardly from and extends along a line being oriented parallel to said bottom edge of said front wall, said connection point of said second flap extending along a full width of said second flap, said second flap having a first sidelong edge and a second sidelong edge and a lower edge, said lower edge of said second flap having a first angled portion which angles between said first sidelong edge and a curved portion of said lower edge of said second flap, said lower edge of said second flap having a second angled portion which angles between said second sidelong edge and said curved portion, said curved portion forming an arc between said first angled portion and said second angled portion, said second flap being foldable over said first flap and a bottom edge of said back wall of said backpack having said second flap extending upwardly along an outer surface of said back wall such that said curved portion of said lower edge of said second flap is spaced upwardly from said bottom edge of said back wall, said connection point of said first flap and said connection point of said second flap each being defined by stitching which extends through said first flap and said back wall of said backpack and said second flap;

a pair of pouches, each of said pair of pouches being attached to said backpack wherein each of said pair of pouches is configured to contain tools and accessories related to employing fire hoses, each of said pair of pouches being disposed on opposite sides of said backpack with respect to each other, each of said pair of pouches having a rear edge being coupled to a respective one of said first lateral side and said second lateral side of said outer wall of said backpack at a point being located adjacent to a lower edge of said outer wall, each of said pair of pouches having an upper end being open into an interior of a respective pouch, each of said pair of pouches including a flap being foldable over said upper end of a respective pouch for closing said upper end of said respective pouch;

a pair of first pocket straps, each of said first pocket straps having a first pocket connection point extending from a first end of a respective first pocket strap toward a second end of said respective first pocket strap, said first pocket connection point comprising stitching extending through said first pocket straps and a front wall of a respective one of said pair of pouches;

a pair of second pocket straps, each of said pair of second pocket straps having a second pocket connection point extending from a first end of a respective second pocket strap toward a second end of said respective second pocket strap, said second pocket connection point comprising stitching extending through said second pocket straps and said flap of a respective one of said pair of pouches;

a pair of first pocket couplers, each of said pair of first pocket couplers being movably disposed on a respective one of said pair of first pocket straps proximate said first end of said respective first pocket strap;

a pair of second pocket couplers, each of said pair of second pocket couplers being movably disposed on a respective one of said pair of second pocket straps proximate said second end of said respective second pocket strap, each of said pair of first pocket couplers being releasably matable to a respective one of said pair of second pocket couplers for closing said flap on said respective pouch;

a carrying strap being positioned on said outer wall of said backpack, said carrying strap extending between each of said pair of pouches, said carrying strap having a plurality of connection points being spaced apart from each other and being distributed along said carrying strap thereby defining a plurality of free portions of said carrying strap which are spaced from said outer wall such that each of said free portions defines a respective one of a plurality of handles on said carrying strap which each curves away from said outer wall wherein said each of said handles is configured to be gripped for carrying said backpack, each of said plurality of connection points on said carrying strap being defined by stitching which extends through said carrying strap and said outer wall of said backpack, a respective one of said plurality of handles being located on an apex of said upper side of said outer wall wherein said handle on said apex of said upper side of said outer wall is configured to facilitate said backpack to be carried in an upright position, each of a respective pair of said plurality of handles being located on a respective one of said first lateral side and said second lateral side of said outer wall at a point being located above a respective one of said pair of pouches wherein each of said pair of handles on said respective first lateral side or said second lateral side is configured to facilitate said backpack to be carried on its side;

a first strap having a first connection point extending from a first end of said first strap toward a second end of said first strap, said first connection point comprising stitching extending through said first strap and a front surface of said first flap;

a second strap having a second connection point extending from a first end of said second strap toward a second end of said second strap, said second connection point comprising stitching extending through said second strap and said back surface of said dividing wall;

a first coupler being movably disposed on said first strap such that said first coupler is located proximate said second end of said first strap;

a second coupler being movably disposed on said second strap such that said second coupler is located proximate said second end of said second strap, said first coupler being releasably matable to said second coupler for securing said first flap over said first half of said interior space of said backpack wherein each of said first coupler and said second coupler are configured to retain the respective fire hose in said first half of said interior space;

a third strap having a third connection point extending from a first end of said third strap toward a second end of said third strap, said third connection point comprising stitching extending through said third strap and a front surface of said second flap such that said third strap extends beyond said curved portion of said lower edge of said second flap;

a third coupler being movably disposed on said third strap such that said third coupler is located proximate said second end of said third strap;

a fourth strap having a fourth connection point extending from a first end of said fourth strap toward a second end of said fourth strap, said fourth connection point comprising stitching extending through said fourth strap and upper side of said outer wall of said backpack having said fourth strap being located on said apex of said of said upper side of said outer wall of said backpack;

a fourth coupler being movably disposed on said fourth strap such that said fourth coupler is located proximate said second end of said fourth strap;

a fifth strap having a fifth connection point extending from a first end of said fifth strap toward a second end of said fifth strap, said fifth connection point comprising stitching extending through said fifth strap and said and upper side of said outer wall of said backpack such that said fifth strap is aligned with said fourth strap having said fifth strap extending downwardly along said back wall of said backpack;

a fifth coupler being movably disposed on said fifth strap such that said fifth coupler is located proximate said second end of said fifth strap, said fifth coupler being releasably matable to said third coupler for attaching said fifth strap to said third strap for securing said second flap over said first flap and said second half of said interior space of said backpack wherein each of said fifth coupler and said third coupler are configured to retain the respective fire hose in said second half of said interior space;

wherein said third coupler is releasably matable to said fourth coupler in lieu of being releasably matable to said fifth coupler such that said third strap extends upwardly along a full height of said back wall of said backpack wherein each of said third strap and said fourth strap is configured to secure a respective fire hose to said back wall of said backpack thereby facilitating the respective fire hose on said back wall to be transported for subsequent use; and a shoulder harness being attached to said backpack wherein said shoulder harness is configured to be worn over shoulders of a firefighter thereby facilitating the firefighter to carry said backpack on the firefighter's back, said shoulder harness comprising:

a shoulder strap having a shoulder connection point being centrally located between a first end of said shoulder strap and a second end of said shoulder strap, said shoulder connection point comprising stitching extending through said shoulder strap and said front wall of said backpack having said shoulder connection point extending laterally along said front wall to define a pair of shoulder portions of said shoulder strap extending downwardly along said front wall wherein each of said pair of shoulder portions is configured to extend downwardly along the firefighter's chest when said shoulder harness is worn over the firefighter's shoulders;

a pair of shoulder buckles, each of said pair of shoulder buckles being attached to a respective one of said pair of shoulder portions having each of said pair of shoulder buckles being located adjacent to a distal end of said respective shoulder portion;

a pair of lower shoulder straps, each of said pair of lower shoulder straps having a coupled end being coupled to said front wall of said backpack at a point located adjacent to a respective one of said first lateral side and said second lateral side of said outer wall of said backpack, each of said pair of lower shoulder straps extending through a respective one of said pair of shoulder buckles for adjusting a length of said shoulder harness;

a first waist belt having a coupled end being attached to said front wall of said backpack at a point located adjacent to said first lateral side of said outer wall of said backpack;

a second waist belt having a coupled end being attached to said front wall of said backpack at a point located adjacent to said second lateral side of said outer wall of said backpack;

a first waist coupler being attached to a free end of said first waist belt; and a second waist coupler being attached to a free end of said second waist belt, said first waist coupler being releasably matable to said second waist coupler wherein each of said first waist coupler and said second waist coupler are configured to retain said first waist belt and said second waist belt around a waist of the firefighter.

* * * * *